United States Patent [19]

Tim Kao

[11] Patent Number: 5,798,691
[45] Date of Patent: Aug. 25, 1998

[54] ACCESSORY BRAKE LIGHT SYSTEM FOR AUTOMOBILE

[76] Inventor: Nien Tsu Tim Kao, 13018 Park View Dr., Baldwin Park, Calif. 91706

[21] Appl. No.: 821,060

[22] Filed: Mar. 20, 1997

[51] Int. Cl.⁶ ........................................ B60Q 1/44
[52] U.S. Cl. .................. 340/479; 340/467; 340/468; 340/463; 340/464; 200/61.58 R
[58] Field of Search ................... 340/479, 467, 340/468, 463, 464; 362/61, 80; 200/83 R, 83 A, 835, 61.58 R

[56] References Cited

U.S. PATENT DOCUMENTS

| D. 345,023 | 3/1994 | Janasiak | D26/35 |
|---|---|---|---|
| 2,751,458 | 6/1956 | Kayuha | 340/479 |
| 3,548,124 | 12/1970 | Tollerud | 340/479 |
| 4,286,309 | 8/1981 | Rasinski | 362/61 |
| 4,287,837 | 9/1981 | Bayles | 108/154 |
| 4,651,129 | 3/1987 | Wood et al. | 340/479 |
| 4,916,431 | 4/1990 | Gearey | 340/479 |
| 4,940,962 | 7/1990 | Sarokin | 340/479 |
| 5,025,245 | 6/1991 | Barke | 340/471 |
| 5,150,098 | 9/1992 | Rakow | 340/479 |
| 5,188,445 | 2/1993 | Haun et al. | 362/80 |
| 5,195,813 | 3/1993 | Brown | 362/61 |
| 5,258,740 | 11/1993 | Viano et al. | 340/467 |
| 5,373,426 | 12/1994 | O'Sullivan | 362/83.3 |
| 5,537,091 | 7/1996 | Hull et al. | 340/479 |
| 5,631,628 | 5/1997 | Solis, Jr. | 340/479 |

*Primary Examiner*—Jeffery A. Hofsass
*Assistant Examiner*—Ashok Mannava
*Attorney, Agent, or Firm*—David & Raymond; Raymond Y. Chan

[57] ABSTRACT

An accessory brake light system for automobile includes an elongated housing having a receiving cavity therein and a front transparent shield covering the receiving cavity, a lighting apparatus having a plurality of brake lighting LEDs mounted within the receiving cavity of the elongated housing, an electrical controlling device for connecting the lighting apparatus with the power source of the automobile and activating the lighting apparatus to provide lighting when the automobile is braked, and a mounting means for firmly securing the elongated housing to a frontmost central position of the automobile, such as a central position on the front bumper, the front license case, or a radiation cover positioning between the two front head lamps of the automobile. Whereby the automobile can provide specific warning signals when the automobile is braking to slow down or fully stopped, in order to enable the other vehicles or pedestrians that are positioned in front of the vehicle to clearly aware that whether the driver of that vehicle is preparing to stop or not and hence reduce the chance of accident from happening.

8 Claims, 6 Drawing Sheets

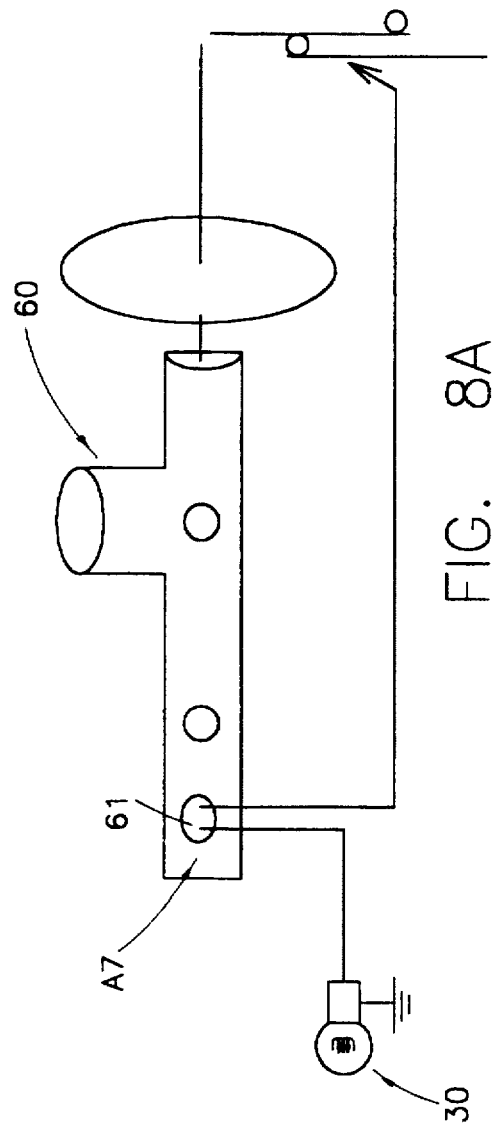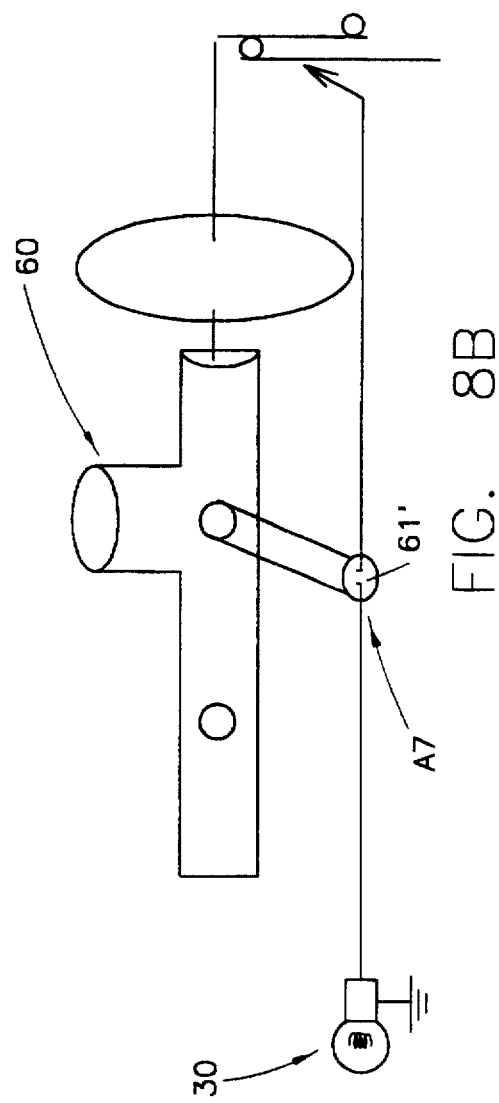

“5,798,691”

ACCESSORY BRAKE LIGHT SYSTEM FOR AUTOMOBILE

BACKGROUND OF THE PRESENT INVENTION

The present invention relates to brake light system of automobile, and more particularly to a front braking light device for automobile that provides warning signal for other vehicles or pedestrians positioned in front of the vehicle.

An essential part of our daily life is to travel from one place to another by automobiles. Every time when people travel, to arrive safely to the desire location is the main goal. The conventional rear brake light system has its own main function in preventing accident from happening. The conventional rear brake light system is usually arranged at two sides of the tail of the car. After 1991, most new vehicles have installed, in addition, a third rear brake light arrangement at a central lower end or a central top end of the rear windshield. The purpose of the third brake light arrangement is to increase visibility so that other vehicles which are behind your car can know that you are stopping or slowing down.

It is a common experience that when a driver is waiting at an intersection for acrossing or making a left or a right turn, the driver always can not be sure whether the oncoming traffic would stop or run through as the traffic light had just change from green to yellow or even on red light. Similar situation often happens at the stop sign intersection also. Even the pedestrians have the similar problem. When a pedestrian prepares to cross a crosswalk, he or she can not determine whether the oncoming vehicles are braking to stop or attempt to run through. Uncountable accidents occurred under such situation. Sometimes, even the traffic light is already on green for your way, you still can not be sure that the drivers of the oncoming vehicles are ready to stop before their red light or not aware of the red traffic light and running through the intersection or crosswalk rudely. The only way to avoid any unwanted accident is to wait until all the oncoming traffic being fully stopped, even it is on green light, before you start to make a left or right turn at the intersection or to cross the crosswalk.

The simplest way to indicate the braking condition of an automobile for those vehicles or pedestrians in front of the automobile is to further install a conventional "third" rear brake light arrangement to the front end the automobile. Such conventional rear brake light arrangement generally comprises a lamp box and at least a lamp bulb electrically mounted inside the lamp box. However, the pair of head lights occupies the major area of the front end of the vehicle. In order to maintain the original appearance design of the vehicles, most drivers refuse to install such conventional lamp box of conventional brake light arrangement onto the bumper. It is also impossible to install the conventional brake light arrangement in the upper or lower side of the front windshield because it would obstruct the viewing of the driver. Besides, there are still many reasons that the conventional brake light arrangement is not suitable to be utilized as a front brake light system. For example, since the light source of the conventional brake light is generated from a lamp bulb, due to the shiny sun light, the light generated from the lamp bulb would not be able to clearly identify during the day time. Therefore, an accessory brake light system which is specifically designed for installing to the front end of a vehicle is highly desired for reducing the chance of accident from happening.

SUMMARY OF THE PRESENT INVENTION

The main objective of the present invention is to provide an accessory brake light system for automobile which is adapted to be installed at a central and frontmost position of a vehicle that can provide specific warning signals when the vehicle is braking to slow down or fully stopped, in order to enable the other vehicles or pedestrians that are positioned in front of the vehicle to clearly aware that whether the driver of that vehicle is preparing to stop or not and hence reduce the chance of accident from happening.

Another objective of the present invention is to provide an accessory brake light system for automobile that can be easily mount on the bumper of a new or used car.

Still another objective of the present invention is to provide an accessory brake light system for automobile that can provides various kinds of warning signals to point out the braking conditions of the automobile for the vehicles or pedestrians positioned in front of the automobile.

Still another objective of the present invention is to provide an accessory brake light system for automobile which electric power supply is controlled by the brake pressure through the intake manifold vacuum principle.

Still another objective of the present invention is to provide an accessory brake light system for automobile which can be constructed to simply utilize the original back brake electric circuit system as the power source thereof Still another objective of the present invention is to provide an accessory brake light system for automobile which electric power supply is controlled by an oil pressure switch that is installed on the brake cylinder or the brake line.

Further another objective of the present invention is to provide an accessory brake light system for automobile that is very noticeable during daytime and improves the outside appearance of the vehicle.

Still further another objective of the present invention is to provide an accessory brake light system for automobile that would provide flashing light which is more noticeable during day time and would not blind the oncoming traffic during night time.

Accordingly, an accessory brake light system for automobile of the present invention comprises an elongated housing having a receiving cavity therein and a front transparent shield covering the receiving cavity, a lighting apparatus having a plurality of brake lighting LEDs mounted within the receiving cavity of the elongated housing, an electrical controlling device for connecting the lighting apparatus with the power source of the automobile and activating the lighting apparatus to provide lighting when the automobile is braked, and a mounting means for firmly securing the elongated housing to a frontmost central position of the automobile, such as a central position on the front bumper, the front license case, or a radiation cover positioning between the two front head lamps of the automobile.

In accordance with an alternative mode of the present invention, the electrical controlling device which can control the lighting apparatus to provide consecutive lighting comprises a power supply for connecting to the power source of the automobile, a signal activating circuitry connecting to a braking signal source of the automobile for activating the electrical controlling device when a braking signal from the braking signal source of the automobile is received, a controllable pulse generating circuitry for generating output pulse, a light controlling circuitry for controlling all the brake lighting LEDs of the lighting apparatus to remain in lighting condition during the continuous braking condition, a pulse activating auto-sequential circuitry, having a single circulating switch for controlling the activation of the light locking circuitry, for generating sequential signal pulses and controlling a sequence of controlling LED which is extended within interior of the automobile to provide consecutive and sequential lighting automatically for enabling the driver to notice the working condition of the front brake light system, and a sequential signal amplifying and relay transforming circuitry having a predetermined number of terminals connecting to the plurality of brake lighting LEDs of the lighting apparatus for amplifying the sequential signal pulses and activating the lighting apparatus to provide consecutive lighting.

BRIEF DESCRIPTION OF THE DRAWINGS

FIG. 8A and 8B are two schematic views of an alternative electrical power supply control of the present invention.

DETAILED DESCRIPTION OF THE PREFERRED EMBODIMENTS

Figure 1:
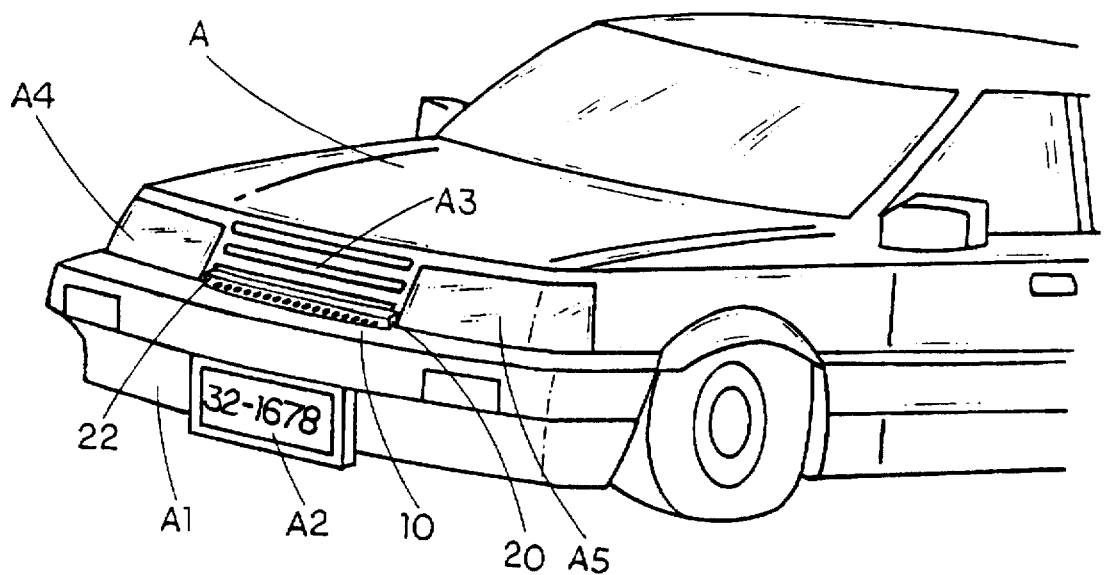
FIG. 1 is a perspective view of an automobile installed with an accessory brake light system according to a first preferred embodiment of the present invention.

Referring to FIG. 1 to FIG. 4, a first preferred embodiment of the present invention is illustrated, which provides an accessory brake light system 10 specifically adapted to installed on the front end of a vehicle. The accessory brake light system 10 for automobile of the present invention comprises an elongated housing 20, a lighting apparatus 30, an electrical controlling device 40, and a mounting means 50 for firmly securing the elongated housing 20 to a frontmost central position of an automobile A, such as a central position on a front bumper A1, a front license case A2, or a radiation cover A3 positioning between the two front head lamps A4, A5 of the automobile A.

Figure 3:
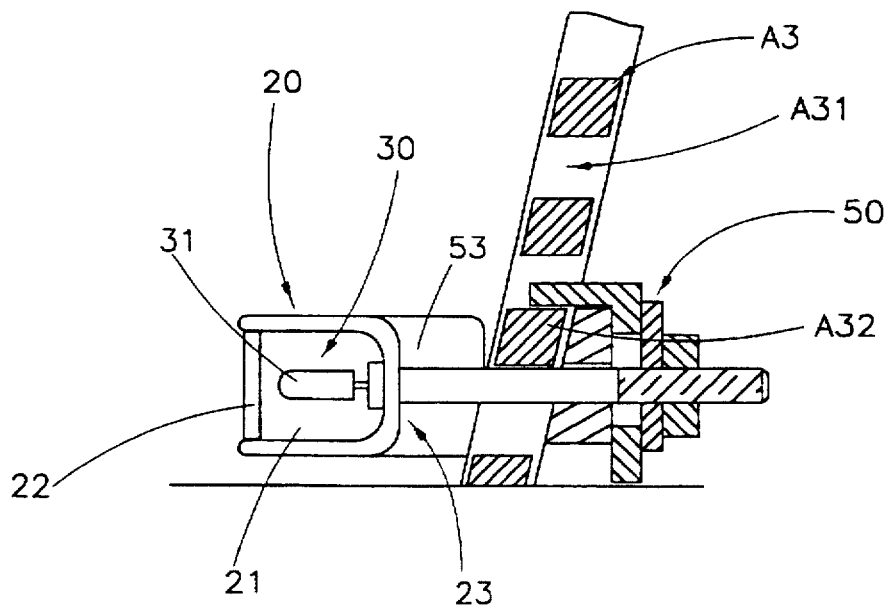
FIG. 3 is a partial section view for illustrating the installation of the above first preferred embodiment onto a radiation cover of the automobile according to the present invention.
Figure 4A:
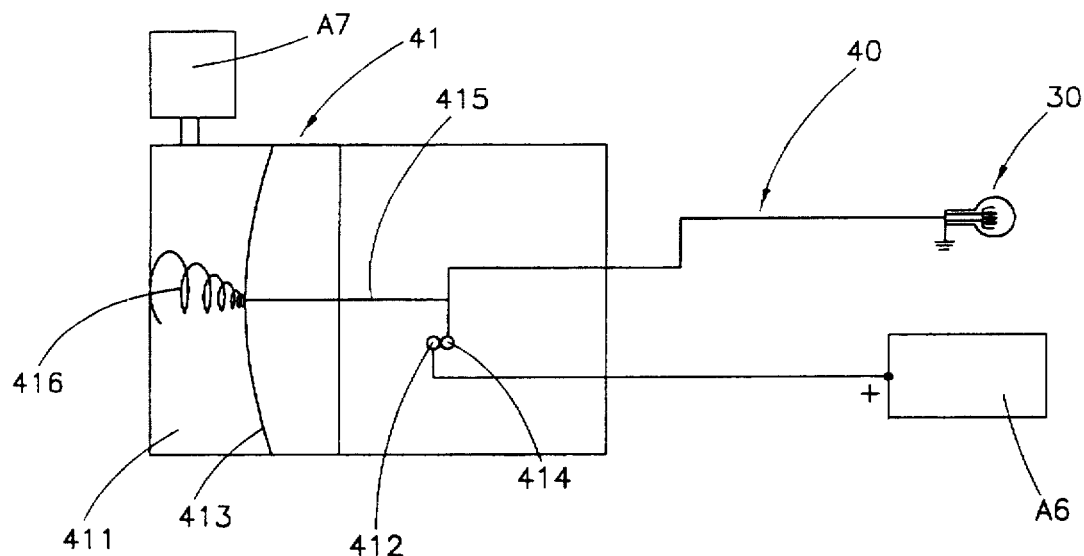
FIGS. 4A and 4B are the schematic circuit diagrams of the above first preferred embodiment of the present invention.
Figure 4B:
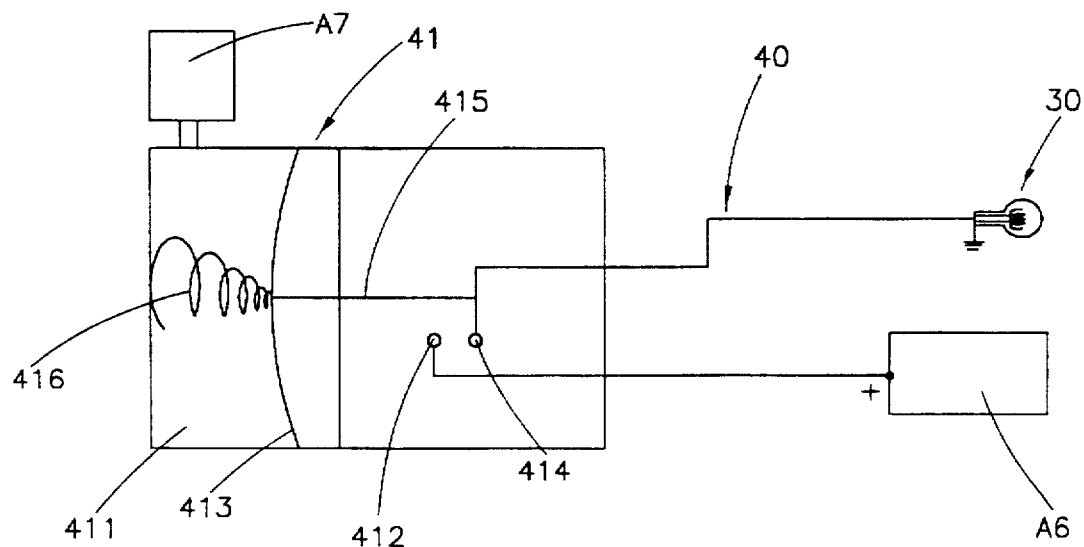

As shown in FIGS. 1 and 3, the elongated housing 20 has a receiving cavity 21 therein and a front transparent shield 22 covering the receiving cavity 21. The lighting apparatus 30, as shown in FIG. 3, has a plurality of brake lighting LEDs 31 mounted within the receiving cavity 21 of the elongated housing 20. As shown in FIGS. 4A and 4B, the electrical controlling device 40 is electrically connected with the lighting apparatus 30, a brake lighting circuit A6 of the automobile A installing the accessory brake light system 10 of the present invention and a braking signal source A7. The electrical controlling device 40 is adapted for activating the lighting apparatus 30 to provide lighting when braking signals are received from the signal source A7 during the braking condition of the automobile A.

Figure 2:
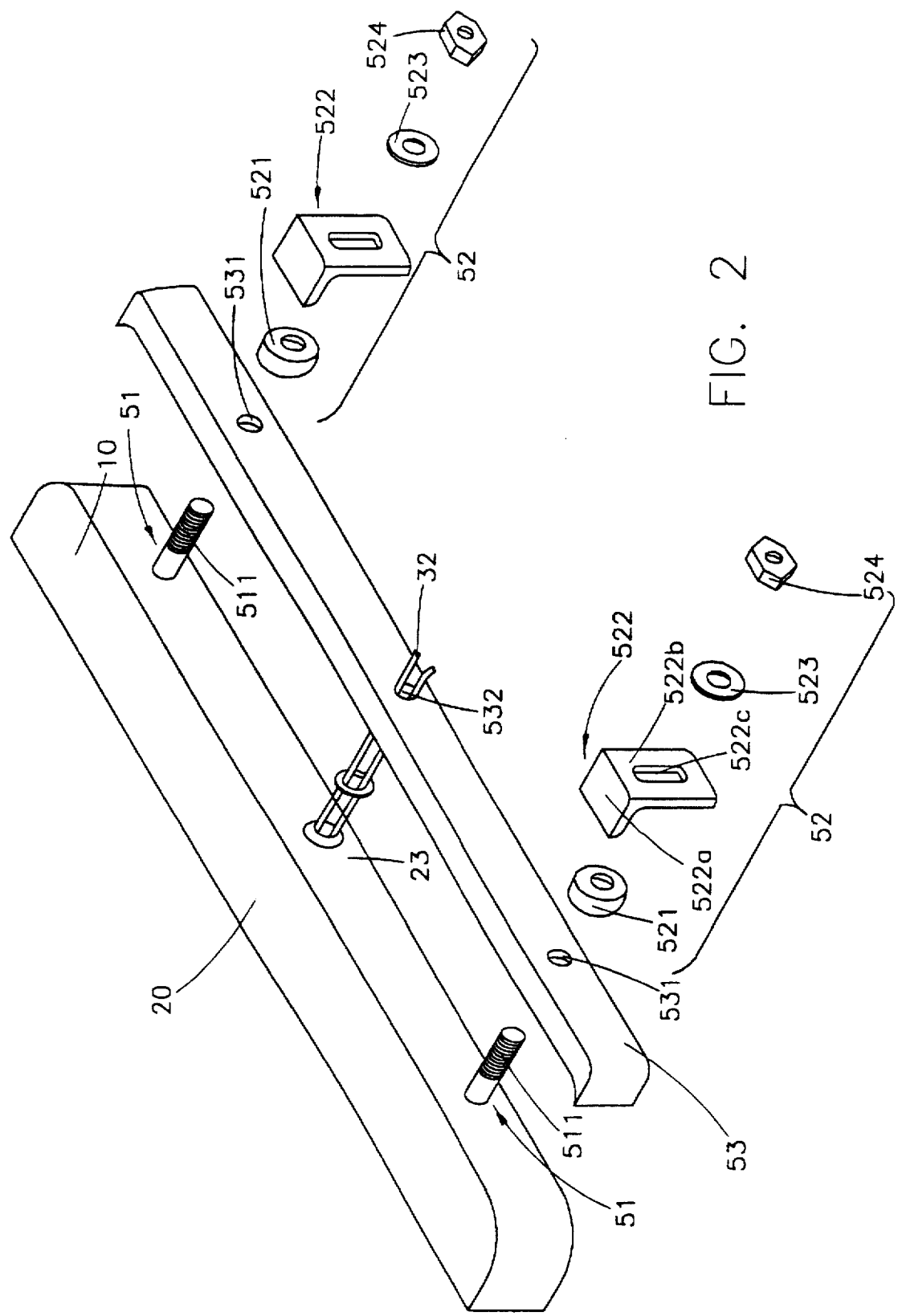
FIG. 2 is an exploded perspective view of the above first preferred embodiment according to the present invention.

In accordance with the first preferred embodiment of the present invention, the mounting means 50 is adapted for directly mounting the elongated housing 20 onto the radiation cover A3 without any modification to the automobile body, as shown in FIG. 1, so that the lighting apparatus 30 inside the elongated housing 20 is able to connect with the brake lighting circuit A6 inside the automobile A through the radiation cover A3. Referring to FIGS. 2 and 3, the mounting means 50 comprises a pair of holding stems 51 rearwardly connected to two ends of a back side 23 of the elongated housing 20, and a pair of locking units 52 for securing with the two holding stems 51 respectively so as to firmly hold the elongated housing 20 on the front side of the radiation cover A3.

As shown in FIGS. 2 and 3, each of the two holding stems 51 has a threaded end portion 511. Each locking unit 52 comprises a first washer 521 made of plastic material, a L-shaped mounting stand 522 having a horizontal piece 522a and a vertical piece 522b on which an elongated hole 522c is provided, a second washer 523 made of metal, and a nut 524 adapted to screw on the threaded end portion 511 of the holding stem 51.

Accordingly, as shown in FIG. 3, the elongated housing 20 can be installed in position by penetrating the two holding stems 51 through the ventilating opening A31 of the radiation cover A3 until the threaded end portion 511 is positioned behind the radiation cover A3. The two holding stems 51 are further penetrated through the two first washers 521, the two elongated holes 522c of the two mounting stands 522, and the two second washer 523 respectively, wherein the two horizontal pieces 522a of the two mounting stands 522 are rested on a supporting frame A32 of the radiation cover A3 respectively.

By tightly screwing the two nuts 524 with the threaded end portions 511 of the two holding stems 52 respectively, the elongated housing 20 can be pulled rearwardly until it is firmly attached on the front side of the radiation cover A3. The soft first washers 521 are positioned between the back side of the radiation cover A3 and the vertical pieces 522b of the two mounting stands 522 to absorb any vibration of the mounting means 52. The pair of mounting stands 522 helps the elongated housing 20 to be secured on a desired height on the radiation cover A3 by hooking the two horizontal pieces 522a on the corresponding supporting frame A32 of the radiation cover A3, as illustrated in FIG. 3.

In order to prevent any impacting between the elongated housing 20 and the radiation cover A3 and absorb any vibration occurred therebetween, the mounting means 50 further comprises an intermediate pad 53, as shown in FIGS. 2 and 3, which is made of soft material such as EVA or other foaming materials. The intermediate pad 53, which is positioned between the back side of the elongated housing 20 and the front side of the radiation cover A3, has two end holes 531 and a central hole 532 provided thereon. The two end holes 531 enables the two holding stems 51 to penetrate through and the central hole 532 enables the electrical wires 32 of the lighting apparatus 30 to pass through for extending behind the radiation cover A3 into the automobile A.

Referring to FIGS. 4A and 4B, the electrical controlling device 40 of the first preferred embodiment comprises a mechanic brake switch assembly 41 incorporating with the intake manifold of the automobile A which acts as the braking signal source A7. Basically, when the automobile A is in idle condition, the vacuum condition of the intake manifold A7 has a maximum value. However, when the automobile A is accelerating, the vacuum value of the intake manifold A7 decreases. Therefore, the accessory brake light system 10 can be controlled by vacuum controlling front brake method. By applying the vacuum principle of intake manifold A7 which has largest vacuum valve during idle period of the automobile A, the activation of the accessory brake light system 10 is controlled by the strength of the vacuum intensity. When the vehicle is accelerating, the vacuum value is small, the accessory brake light system 10 can thus be cut off to fulfill the objective of controlling the brake switch.

The mechanic brake switch assembly 41 has a vacuum chamber 411 linked to the intake manifold A7, a stationary terminal 412 electrically connected to the power source, such as the stop light switch, the light failure sensor, the switch of the rear brake light system, or any positive electric wiring, of the automobile A, a driving valve 413 disposed in the vacuum chamber 411, a motion terminal 414 electrically connected with the lighting apparatus 30, a driving stem 415 connected the driving valve 413 with the motion terminal 414, and a spring element 416 mounted behind the driving valve 413 for pushing the driving valve 413 outwards so as to push the motion terminal 414 away from the stationary terminal 412 during "unbrake" condition, i.e. the accelerating condition of the automobile. Since the stationary terminal 412 and the motion terminal 414 of the electrical controlling device 40 is not in contact, the electrical circuit of the accessory brake light system 16 is opened, and thus no brake light will be provided.

When the automobile is braked, the vacuum condition inside the vacuum chamber 411 is increased to a maximum value, the driving valve 413 is sucked to move inwards. At that time, the motion terminal 414 is pulled towards and kept in contact with the stationary terminal 412. Therefore, the electrical controlling device 40 is activated and the electrical circuit of the accessory brake light system 10 is closed. The lighting apparatus 30 is activated to provide braking light.

It is worth to mention that a simplest way of electrical connecting the accessory brake light system 10 with the power source of the automobile A is to electrically connect the lighting apparatus 30 with the electric circuit of the conventional rear brake light system, so that when the rear brake light is activated, the accessory brake light system 10 will be activated simultaneously. Furthermore, the accessory brake light system 10 can also be controlled by pressure cause by the braking action braking to control the switch of the braking light. When the brake is apply, the pressure generate from the braking action can be use to activate the lighting apparatus 30 of the accessory brake light system 10.

Figure 5:
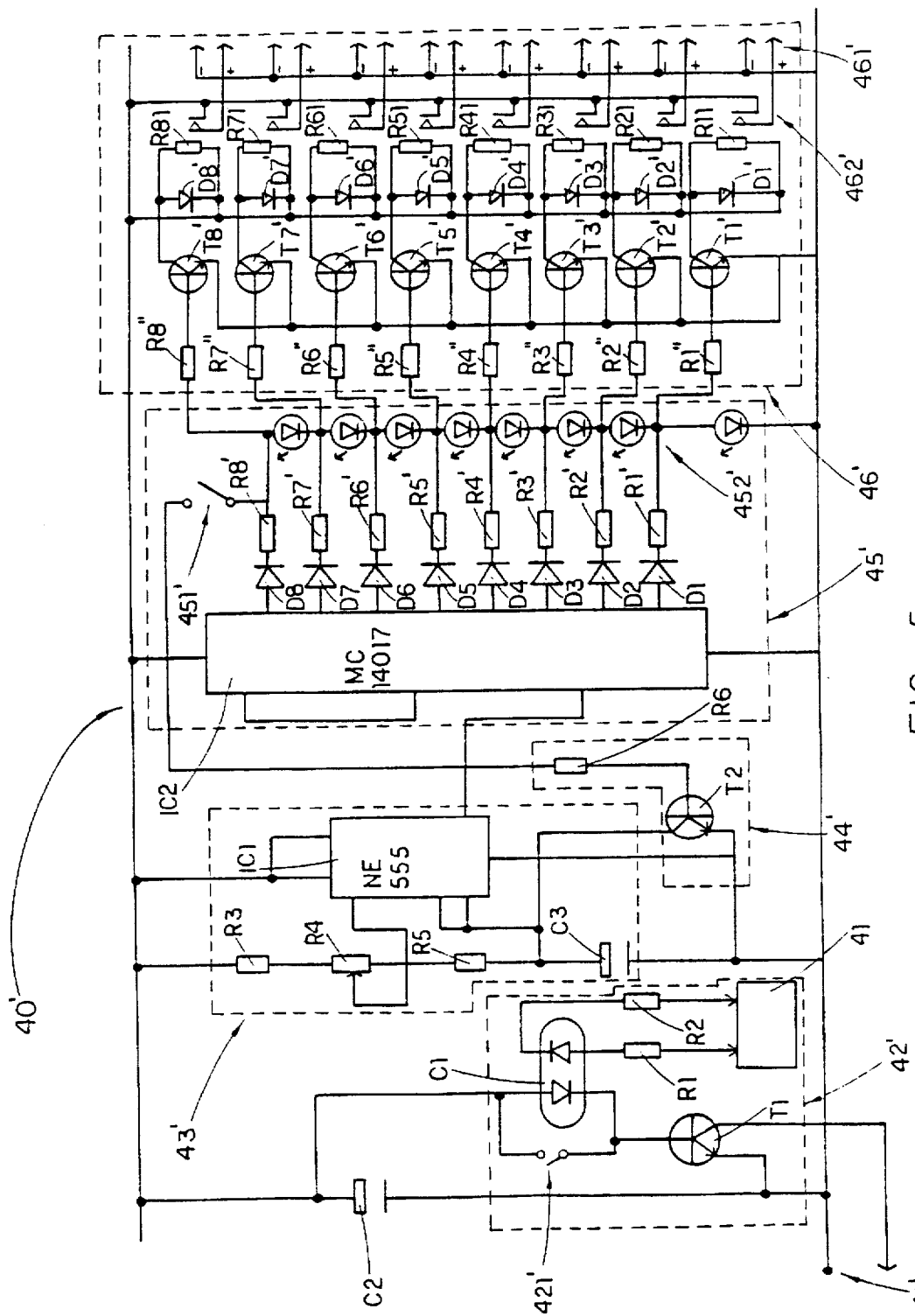
FIG. 5 is a circuit diagram of a second preferred embodiment according to the present invention.
Figure 6:
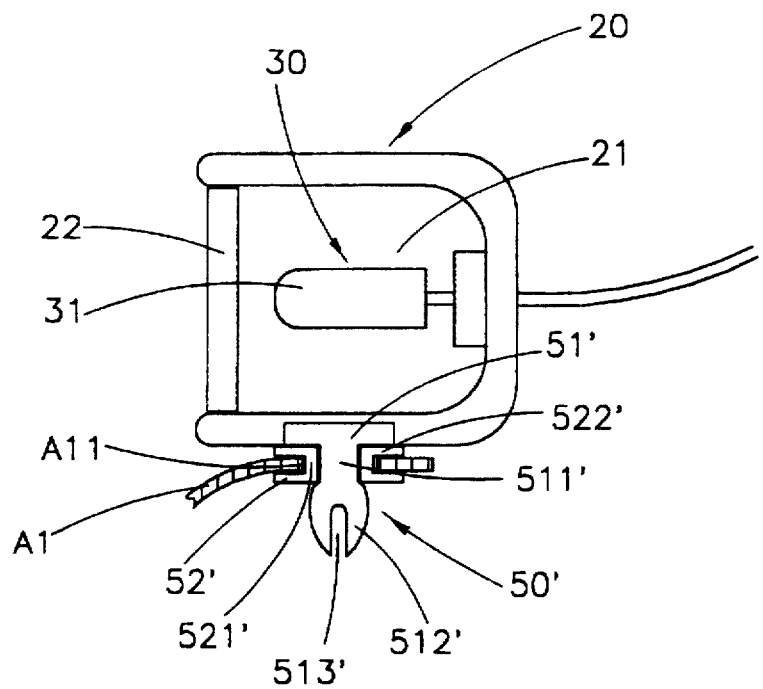
FIG. 6 is partial section view of an alternative mode of the mounting device for securing the lighting device of the first or second preferred embodiment onto a bumper of the automobile according to the present invention.

Referring to FIGS. 5 and 6, a second preferred embodiment of the present invention is illustrated, wherein the elongated housing 20 with the lighting apparatus 30 installed therein is rigidly mounted on the front bumper A1 of the automobile A by means of an alternative mode of the mounting device 50'. The mounting device 50' of the second embodiment comprises a plurality of plugs 51' integrally attached to the bottom side of the elongated housing 20, and a plurality of holding rings 52'.

As shown in FIG. 6, each plug 51' comprises a neck portion 511' extended downwardly and an enlarged head portion 512' integrally extended from the neck portion 511'. The head portion 512' of each plug 51' has a slot 513' so that when a compress pressure is applied to the head portion 512', the diameter of the head portion 512' can be reduced. In order to install the elongated housing 20 on the front bumper A1, a plurality of connecting holes A11 is drilled on the top surface or the front surface of the front bumper A1. Each of the holding rings 52' has a central holding hole 521' which has a diameter and a thickness slightly smaller than or equal to the diameter and the length of the neck portion 511' of the plug 51' respectively. Each holding ring 52' further has a periphery groove 522' for engaging to the respective connecting hole A11 on the front bumper A1. Thus, the elongated housing 20 can be firmly mounted on the front bumper A1 by tightly plugging the plugs 51' through the plurality of holding rings 52', as shown in FIG. 6.

In accordance with the second preferred embodiment of the present invention, the electrical controlling device is designed to control the lighting apparatus 30 to provide consecutive lighting for enhancing the visibility of the brake lighting by means of an alternative mode of the electrical controlling device 40'.

The electrical controlling device 40' of the second embodiment comprises a power supply terminals 41' for connecting to the power source of the automobile A, a signal activating circuitry 42' connecting to a braking signal source A7 of the automobile A for activating the electrical controlling device 40' when a braking signal from the braking signal source A7 of the automobile is received, a controllable pulse generating circuitry 43' for generating output pulse, a light controlling circuitry 44' for controlling all the brake lighting LEDs 31 of the lighting apparatus 30 to remain in lighting condition during the continuous braking condition, a pulse activating auto-sequential circuitry 45', having a single circulating switch 451' for controlling the activation of the light controlling circuitry 44', for generating sequential signal pulses and controlling a sequence of controlling LED 452' which is extended within interior of the automobile A to provide consecutive and sequential lighting automatically for enabling the driver to notice the working condition of the front brake light system 10, and a sequential signal amplifying and relay transforming circuitry 46' having a predetermined number of terminals 461' connecting to the plurality of brake lighting LEDs 31 of the lighting apparatus 30 for amplifying the sequential signal pulses and activating the lighting apparatus 30 to provide consecutive lighting.

The power supply terminals 41' are electrically connected with any positive power wiring of the automobile A. The signal activating circuitry 42' comprises a manual activating switch 421' which is to turn on the accessory brake light system 10 manually under emergency situation, a coupler C1, two resistors R1, R2, and a transistor T1, in which the transistor T1 is connected in series with the power supply terminals 41' and the manual activating switch 421' which is further connected in parallel with a capacitor C2 and the coupler C1 which is connected in series with the resistors R1, R2. The resistors R1 and R2 are connected to the braking signal source A7 of the automobile A through a brake switch assembly 41 as disclosed in the above first embodiment.

The controllable pulse generating circuitry 43' comprises a NE-555 integral circuit C1, three resistors R3, R4, R5, and a capacitor C3, in which the capacitor C3 is connected in series with the resistors R3, R4, R5 which are further connected in parallel with the NE-555 integral circuit IC1.

The light controlling circuitry 44' comprises a resistor R6 and a transistor T2, in which the resistor R6 is connected in series with the transistor T2 which is further connected in parallel with the capacitor C3 of the controllable pulse generating circuitry 43' and connected in series with the NE-555 integral circuit IC1 of the controllable pulse generating circuitry 43'.

The pulse activating auto-sequential circuitry 45' further comprises a MC-14017 integral circuit IC2, a plurality of diodes D1–D8, and a plurality of corresponding resistors R1'–R8', in which the MC-14017 integral circuit IC2 is connected in series with NE-555 integral circuit IC1, the plurality of diodes D1–D8 which are further connected in series with the plurality of resistors R1'–R8' respectively. The single circulating switch 451' is connected in series with the resistor R6 and the resistor R8'. The plurality of corresponding resistors R1'–R8' are optionally connected in parallel with the sequence of controlling LED 452'.

The sequential signal amplifying and relay transforming circuitry 46' comprises a first set of corresponding resistors R1"–R8" respectively connected in series with the corresponding resistors R1'–R8' of the pulse activating auto-sequential circuitry 45', a plurality of corresponding transistors T1'–T8' respectively connected in series with the first set of corresponding resistors R1"–R8" and a second set of corresponding resistors R11–R81 which are respectively connected in parallel with a plurality of corresponding diodes D1'–D8', a plurality of corresponding switches 462', and the plurality of corresponding terminals 461' as mentioned above. The plurality of corresponding switches 462' are connected to the power supply terminals 41' and the plurality of corresponding terminals 461'.

Accordingly, a brake signal is sent from the brake switch assembly 41 to the signal activating circuitry 42' when the mechanic brake switch assembly 41 detects a braking action of the automobile A. The controllable pulse generating circuitry 43' then generates an output pulse transmitted to the pulse activating auto-sequential circuitry 45' which will generate sequential signal pulses and transmit the sequential signal pulses to the sequential signal amplifying and relay transforming circuitry 46' for amplifying the sequential signal pulses and activating the brake lighting LEDs 31 of the lighting apparatus 30 to provide sequential and consecutive lighting. Consecutive lighting can provide better visibility to the vehicles and pedestrians in front of the automobile A, so that the oncoming vehicles and pedestrians can clearly aware the braking condition of the automobile A.

Moreover, when the single circulating switch 451' is turned off, the lighting apparatus 30 will provide continuous sequential lighting, i.e. the brake lighting LEDs 31 will light one after one consecutively. However, when the single circulating switch 451' is turned on, the brake lighting LEDs 31 of the lighting apparatus 30 will be activated to switch on one by one and then remain all in lighting condition. Therefore, when the automobile A is slightly braked for deceleration only, for example the braking time is shorter than the time required by the lighting apparatus 30 to light up all the brake lighting LEDs 31 one by one, the lighting apparatus 30 will be vanished before all the brake lighting LEDs 31 are lighted up. Therefore, the oncoming vehicles and pedestrians in front of the automobile A may observe that the automobile is just decelerating but not prepared to be fully stopped. Moreover, the single circulating switch 451' can be extended to install in the interior of the automobile A so that the driver can switch on or off the single circulating switch 451' anytime.

Figure 7:
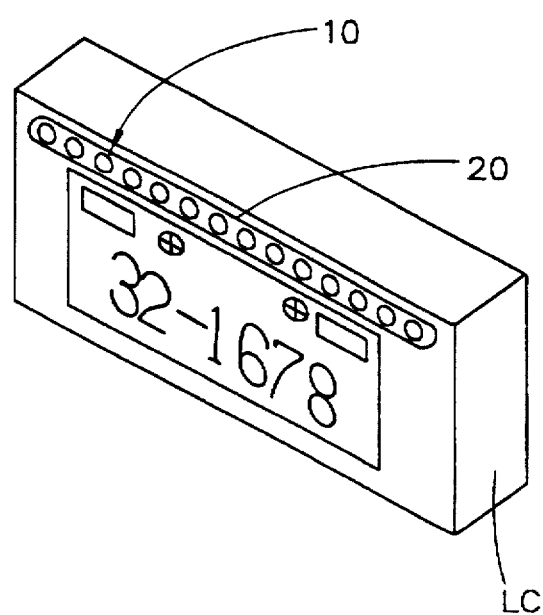
FIG. 7 is a perspective view of a front license case having the lighting device of the above first or second embodiment installed thereon.

Referring to FIG. 7, a modification of the above first or second embodiment is illustrated, in which the elongated housing 20 of the accessory brake light system 10 is mounted within a front license case LC instead of the radiation cover A3 or the front bumper A1.

Referring to FIG. 8A, an alternative electrical power supply of the present invention is illustrated, which comprises a brake switch 61, such as oil pressure switch, installed in a brake cylinder 60 of the automobile so as to act as the braking signal source A7. Basically, when the automobile is breaking, the pressure generated in said brake cylinder may switch on the brake switch 61 to generating a braking signal. When the automobile is not breaking, the brake switch 61 would be switched off because no pressure is being generated. As shown in FIG. 8B, a brake switch 61' is connected directly to a brake line of the brake cylinder 60'. During braking action, the brake switch 61' would react as the braking signal source A7 and turn on the accessory brake light system.

Accordingly, the braking signal source of the accessory brake light system for automobile of the present invention can come from vacuum intake manifold, the brake switch incorporating with the brake cylinder of the automobile, or simply directly connect to the electrical wire or the back brake light.

I claim:

1. An accessory brake light system for an automobile, comprising an elongated housing having a receiving cavity therein and a front transparent shield covering said receiving cavity;

a lighting apparatus comprising a plurality of brake lighting LEDs mounted within said receiving cavity of said elongated housing;

an electrical controlling device, electrically connected with said lighting apparatus, a power source of said automobile and a braking signal source, for activating said lighting apparatus to provide lighting when braking signals are received from said braking signal source during a braking condition of said automobile, wherein said electrical controlling device comprises power supply terminals electrically connected with a power wiring of said automobile and a signal activating circuitry connecting to said braking signal source of said automobile for activating said electrical controlling device when said braking signals from said braking signal source of said automobile are received, said signal activating circuitry comprising a manual activating switch which is to turn on said accessory brake light system manually under emergency situation, a coupler C1, two resistors R1, R2, and a transistor T1, in which said transistor T1 is connected in series with said power supply terminals and said manual activating switch which is further connected in parallel with a capacitor C2 and said coupler C1 which is connected in series with said resistors R1, R2, said resistors R1, R2 being connected to said braking signal source of said automobile through a brake switch assembly; and a mounting means for firmly securing said elongated housing to a frontmost central position between two front head lamps of said automobile.

2. An accessory brake light system as recited in claim 1 wherein said brake switch assembly incorporating with said braking signal source which is an intake manifold of said automobile, said brake switch assembly having a vacuum chamber linked to said intake manifold, a stationary terminal electrically connected to said poser supply terminals, a driving valve disposed in said vacuum chamber, a motion terminal electrically connected with said resistors R1, R2, a driving stem connecting said driving valve with said motion terminal, and a spring element mounted behind said driving valve for pushing said driving valve outwards so as to push said motion terminal away from said stationary terminal during an "unbrake" condition, therefore when said automobile is braked, said vacuum condition of said intake manifold of said automobile and inside said vacuum chamber is increased to a maximum value, said driving valve is sucked to move inwards, so that said motion terminal is pulled towards and kept in contact with said stationary terminal, and that said electrical controlling device is activated to activate said lighting apparatus to provide braking light.

3. An accessory brake light system as recited in claim 2 wherein said electrical controlling device further comprises a controllable pulse generating circuitry for generating output pulse, a light controlling circuitry for controlling all said brake lighting LEDs of said lighting apparatus to remain in lighting condition during a continuous braking condition, a pulse activating auto-sequential circuitry which has a single circulating switch for controlling said activation of said light controlling circuitry for generating sequential signal pulses, and a sequential signal amplifying and relay transforming circuitry having a predetermined number terminals connecting to said plurality of brake lighting LEDs of said lighting apparatus for amplifying said sequential signal pulses and activating said lighting apparatus to provide consecutive lighting, wherein said controllable pulse generating circuitry comprises a NE-555 integral circuit IC1, three resistors R3, R4, R5, and a capacitor C3, in which said capacity C3 is connected in series with said resistors R3, R4, R5 which are further connected in parallel with said NE-555 integral circuit IC1, said light controlling circuitry comprising a resistor R6 and a transistor T2, said resistor R6 connecting in series with said transistor T2 which is further connected in parallel with said capacitor C3 of said controllable pulse generating circuitry, wherein said pulse activating auto-sequential circuitry further comprises a MC-14017 integral circuit IC2, a plurality of diodes D1–D8, and a plurality of corresponding resistors R1'–R8', said MC-14017 integral circuit IC2 being connected in series with NE-555 integral circuit IC1, said plurality of diodes D1–D8 being further connected in series with said plurality of R1'–R8' respectively, said single circulating switch being connected in series with said resistor R6 and said resistor R8', said plurality of corresponding resistors R1'–R8' being connected in parallel with said sequence of controlling LED, wherein said sequential signal amplifying and relay transforming circuitry comprises a first set of corresponding resistors R1"–R8" respectively connected in series with said corresponding resistors R1'–R8' of said pulse activating auto-sequential circuitry, a plurality of corresponding transistors T1'–T8' respectively connected in series with said first set of corresponding resistors R1"–RB" and a second set of corresponding resistors R11–R81 which are respectively connected in parallel with a plurality of corresponding diodes D1'–D8', a plurality of corresponding switches, and said plurality of corresponding terminals, said plurality of corresponding switches being connected to said power supply terminals and said plurality of corresponding terminals.

4. An accessory brake light system as recited in claim 2 wherein said elongated housing is mounted in a front license case.

5. An accessory brake light system as recited in claim 3 wherein said elongated housing is mounted in a front license case.

6. An accessory brake light system as recited in claim 1 wherein said electrical controlling device further comprises a controllable pulse generating circuitry for generating output pulse, a light controlling circuitry for controlling all said brake lighting LEDs of said lighting apparatus to remain in lighting condition during a continuous braking condition, a pulse activating auto-sequential circuitry which has a single circulating switch for controlling said activation of said light controlling circuitry for generating sequential signal pulses, and a sequential signal amplifying and relay transforming circuitry having a predetermined number terminals connecting to said plurality of brake lighting LEDs of said lighting apparatus for amplifying said sequential signal pulses and activating said lighting apparatus to provide consecutive lighting, wherein said controllable pulse generating circuitry comprises a NE-555 integral circuit IC1, three resistors R3, R4, R5, and a capacitor C3, in which said capacity C3 is connected in series with said resistors R3, R4, R5 which are further connected in parallel with said NE-555 integral circuit IC1, said light controlling circuitry comprising a resistor R6 and a transistor T2, said resistor R6 connecting in series with said transistor T2 which is further connected in parallel with said capacitor C3 of said controllable pulse generating circuitry, wherein said pulse activating auto-sequential circuitry further comprises a MC-14017 integral circuit IC2, a plurality of diodes D1–D8, and a plurality of corresponding resistors R1'–R8', said MC-14017 integral circuit IC2 being connected in series with NE-555 integral circuit IC1, said plurality of diodes D1–D8 being further connected in series with said plurality of R1'–R8' respectively, said single circulating switch being connected in series with said resistor R6 and said resistor R8', said plurality of corresponding resistors R1'–R8' being connected in parallel with said sequence of controlling LED, wherein said sequential signal amplifying and relay transforming circuitry comprises a first set of corresponding resistors R1"–R8" respectively connected in series with said corresponding resistors R1'–R8' of said pulse activating auto-sequential circuitry, a plurality of corresponding transistors T1'–T8' respectively connected in series with said first set of corresponding resistors R1"–R8" and a second set of corresponding resistors R11–R81 which are respectively connected in parallel with a plurality of corresponding diodes D1'–D8', a plurality of corresponding switches, and said plurality of corresponding terminals, said plurality of corresponding switches being connected to said power supply terminals and said plurality of corresponding terminals.

7. An accessory brake light system as recited in claim 6 wherein said elongated housing is mounted in a front license case.

8. An accessory brake light system as recited in claim 1 wherein said elongated housing is mounted in a front license case.

* * * * *